US010477493B2

(12) United States Patent
Marinier et al.

(10) Patent No.: US 10,477,493 B2
(45) Date of Patent: *Nov. 12, 2019

(54) MAINTAINING TIME ALIGNMENT WITH MULTIPLE UPLINK CARRIERS

(71) Applicant: INTERDIGITAL PATENT HOLDINGS, INC., Wilmington, DE (US)

(72) Inventors: Paul Marinier, Brossard (CA); Bhaskar M. Anepu, Hummelstown, PA (US); Ghyslain Pelletier, Laval (CA); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 786 days.

This patent is subject to a terminal disclaimer.

(21) Appl. No.: 14/580,165

(22) Filed: Dec. 22, 2014

(65) Prior Publication Data

US 2015/0103811 A1   Apr. 16, 2015

Related U.S. Application Data

(63) Continuation of application No. 12/986,549, filed on Jan. 7, 2011, now Pat. No. 8,934,459.
(Continued)

(51) Int. Cl.
*H04B 7/212* (2006.01)
*H04W 56/00* (2009.01)
(Continued)

(52) U.S. Cl.
CPC ......... *H04W 56/0005* (2013.01); *H04L 5/001* (2013.01); *H04L 27/2646* (2013.01); *H04W 56/0045* (2013.01); *H04W 74/0833* (2013.01)

(58) Field of Classification Search
None
See application file for complete search history.

(56) References Cited

U.S. PATENT DOCUMENTS

2005/0243761 A1   11/2005   Terry et al.
2006/0221894 A1   10/2006   Casaccia et al.
(Continued)

FOREIGN PATENT DOCUMENTS

CN   2746688 Y    12/2008
CN   101388722 A   3/2009
(Continued)

OTHER PUBLICATIONS

U.S. Appl. No. 61/258,202, Kuo, "Method and apparatus of Random Access Procedure and HARQ Feedback for Carrier Aggregation in a wireless communication system".*
(Continued)

*Primary Examiner* — Kwang B Yao
*Assistant Examiner* — Juvena W Loo
(74) *Attorney, Agent, or Firm* — Condo Roccia Koptiw LLP

(57) ABSTRACT

Maintaining time alignment with multiple carriers is contemplated. A group of uplink carriers (UL CC sets) that operate with a single Timing Advance (TA) may be determined, and a TA value may be applied to a specific UL CC set. A wireless transmit/receive unit's (WTRU) capability of using multiple TAs may define a group index of a few bits for each UL CC set. A TA Command received in a Random Access Response message may be used to apply the TA value to each UL carrier of the UL CC set. The WTRU may determine which UL CC set the TA value applies to based on which DL carrier the command was transmitted from. The WTRU may determine which UL CC set the TA value applies to based on the Group Index being explicitly pro-
(Continued)

vided in the command. The WTRU may release multi-CC configurations upon Time Alignment Timer (TAT) expiry.

20 Claims, 7 Drawing Sheets

Related U.S. Application Data

(60) Provisional application No. 61/293,271, filed on Jan. 8, 2010, provisional application No. 61/320,449, filed on Apr. 2, 2010, provisional application No. 61/323,680, filed on Apr. 13, 2010.

(51) Int. Cl.
  *H04L 5/00* (2006.01)
  *H04L 27/26* (2006.01)
  *H04W 74/08* (2009.01)

(56) References Cited

U.S. PATENT DOCUMENTS

| | | | |
|---|---|---|---|
| 2006/0280142 A1* | 12/2006 | Damnjanovic | H04B 7/2615 370/329 |
| 2008/0112500 A1 | 5/2008 | Pan et al. | |
| 2008/0318578 A1 | 12/2008 | Worrall | |
| 2009/0204862 A1* | 8/2009 | Chun | H04L 1/1822 714/748 |
| 2009/0279495 A1* | 11/2009 | Yoo | H04L 5/0078 370/329 |
| 2010/0260136 A1 | 10/2010 | Fan et al. | |
| 2011/0103331 A1* | 5/2011 | Kuo | H04L 5/001 370/329 |
| 2011/0158116 A1* | 6/2011 | Tenny | H04W 56/0045 370/252 |
| 2011/0235620 A1 | 9/2011 | Ahn et al. | |
| 2011/0243102 A1* | 10/2011 | Sebire | H04W 56/0045 370/336 |
| 2011/0243111 A1 | 10/2011 | Andgart et al. | |

FOREIGN PATENT DOCUMENTS

| | | |
|---|---|---|
| EP | 2086258 A1 | 8/2009 |
| JP | 2010-530684 A | 9/2010 |
| JP | 2011-508559 A | 3/2011 |
| TW | 2010-02117 A | 1/2010 |
| WO | WO 2008/042967 A2 | 4/2008 |
| WO | WO 2009/096745 A2 | 8/2009 |
| WO | WO 2009/132580 A1 | 11/2009 |
| WO | WO 2010/064842 A2 | 6/2010 |
| WO | WO 2010/151213 A1 | 12/2010 |
| WO | WO 2011/038772 A1 | 4/2011 |

OTHER PUBLICATIONS

U.S. Appl. No. 61/218,769, Tenny.*
U.S. Appl. No. 61/258,202, Kuo.*
3rd Generation Partnership Project (3GPP), R1-094637, "Number of MAC PDUs for Relay Operation", LG Electronics Inc., 3GPP TSG-RAN WG2 #67, Shenzhen, China, Aug. 24-29, 2009, 2 pages.
3rd Generation Partnership Project (3GPP), R2-095484, "Impact of Carrier Aggregation on MAC Layer", CATT, 3GPP TSG-RAN WG2 #67bis, Miyazaki, Japan, Oct. 12-16, 2009, pp. 1-5.
3rd Generation Partnership Project (3GPP), R2-095519, "Carrier Aggregation and Timing Advance", Nokia Siemens Networks, Nokia Corporation, 3GPP TSG-RAN WG2 Meeting #67bis, Miyazaki, Japan, Oct. 12-16, 2009, 2 pages.
3rd Generation Partnership Project (3GPP), R2-095815, "Different Timing Advance Impact on Carrier Aggregation", Huawei, 3GPP TSG RAN WG2 Meeting #67bis, Miyazaki, Japan, Oct. 12-16, 2009, 3 pages.
3rd Generation Partnership Project (3GPP), R2-096506, "Consideration on RACH Procedure and RLF", CATT, 3GPP TSG RAN WG2 Meeting #68 Jeju, Korea, Nov. 9-13, 2009, 2 pages.
3rd Generation Partnership Project (3GPP), R2-096844, "RACH and Carrier Aggregation", Nokia Corporation, Nokia Siemens Networks, TSG-RAN WG2 Meeting #68, Nov. 9-13, 2009, 3 pages.
3rd Generation Partnership Project (3GPP), R2-100423, "Supporting Multiple Timing.Advance Group", Qualcomm Incorporated, 3GPP TSG-RAN WG2 Meeting#68bis, Valencia, Spain, Jan. 18-22, 2010, 3 pages.
3rd Generation Partnership Project (3GPP), R2-101567, "CA Support for Multi-TA", E-mail Rapporteur (NTT DoCoMo, Inc.), 3GPP TSG-RAN2#69, San Francisco, U.S.A, Feb. 22-26, 2010, pp. 1-12.
3rd Generation Partnership Project (3GPP), "TS 36.321 V8.8.0, Technical Specification Group Radio Access Network, Evolved Universal Terrestrial Radio Access (E-UTRA) Medium Access Control (MAC) Protocol Specification (Release 8)", Dec. 2009, pp. 1-47.
3rd Generation Partnership Project (3GPP), TS 36.321 V9.0.0, "Technical Specification Group Radio Access Network, Evolved Universal Terrestrial Radio Access (E-UTRA) Medium Access Control (MAC) Protocol Specification (Release 9)", Sep. 2009, pp. 1-47.
3rd Generation Partnership Project (3GPP), TS 36.321 V9.1.0, "Technical Specification Group Radio Access Network, Evolved Universal Terrestrial Radio Access (E-UTRA) Medium Access Control (MAC) Protocol Specification (Release 9)", Dec. 2009, pp. 1-17.
3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification", Sep. 2009, pp. 1-208.
3rd Generation Partnership Project (3GPP), 3GPP TS 36.331 V9.1.0, "Technical Specification Group Radio Access Network, Evolved Universal Terrestrial Radio Access (E-UTRA) Radio Resource Control (RRC), Protocol Specification (Release 9)", Dec. 2009, pp. 1-232.
European Telecommunications Standards Institute (ETSI), TS 136 321 V9.0.0, "LTE, Evolved Universal Terrestrial Radio Access (E-UTRA), Medium Access Control (MAC) Protocol Specification (3GPP TS 36.321 version 9.0.0 Release 9)", Oct. 2009, pp. 1-49.
Tenny et al., "Timing Alignment in a Multicarrier System", U.S. Appl. No. 61/218,769, filed Jun. 19, 2009, 16 pages.
3rd Generation Partnership Project (3GPP), R2-096488, "CC Management Issues", 3GPP TSG-RAN2 #68 Meeting, Jeju, Korea, Nov. 9-13, 2009, pp. 1-6.
3rd Generation Partnership Project (3GPP), R2-094637, "Number of MAC PDUs for Relay Operation", 3GPP TSG-RAN WG2 # 67 Meeting, ShenZhen, China, Aug. 24-29, 2009, pp. 1-2.
3rd Generation Partnership Project (3GPP), R1-105035, "Downlink CSI-RS Signaling Design for LTE-Advanced", New Postcom, 3GPP TSG RAN WG1 Meeting #62, Madrid, Aug. 23-27, 2010, 5 pages.
3rd Generation Partnership Project (3GPP), R1-094637, "Timing advance for carrier aggregation in LTE-A", Nokia Siemens Networks, Nokia, 3GPP TSG RAN WG1 Meeting #59, Jeju, Korea, Nov. 9-13, 2009, 2 pages.

\* cited by examiner

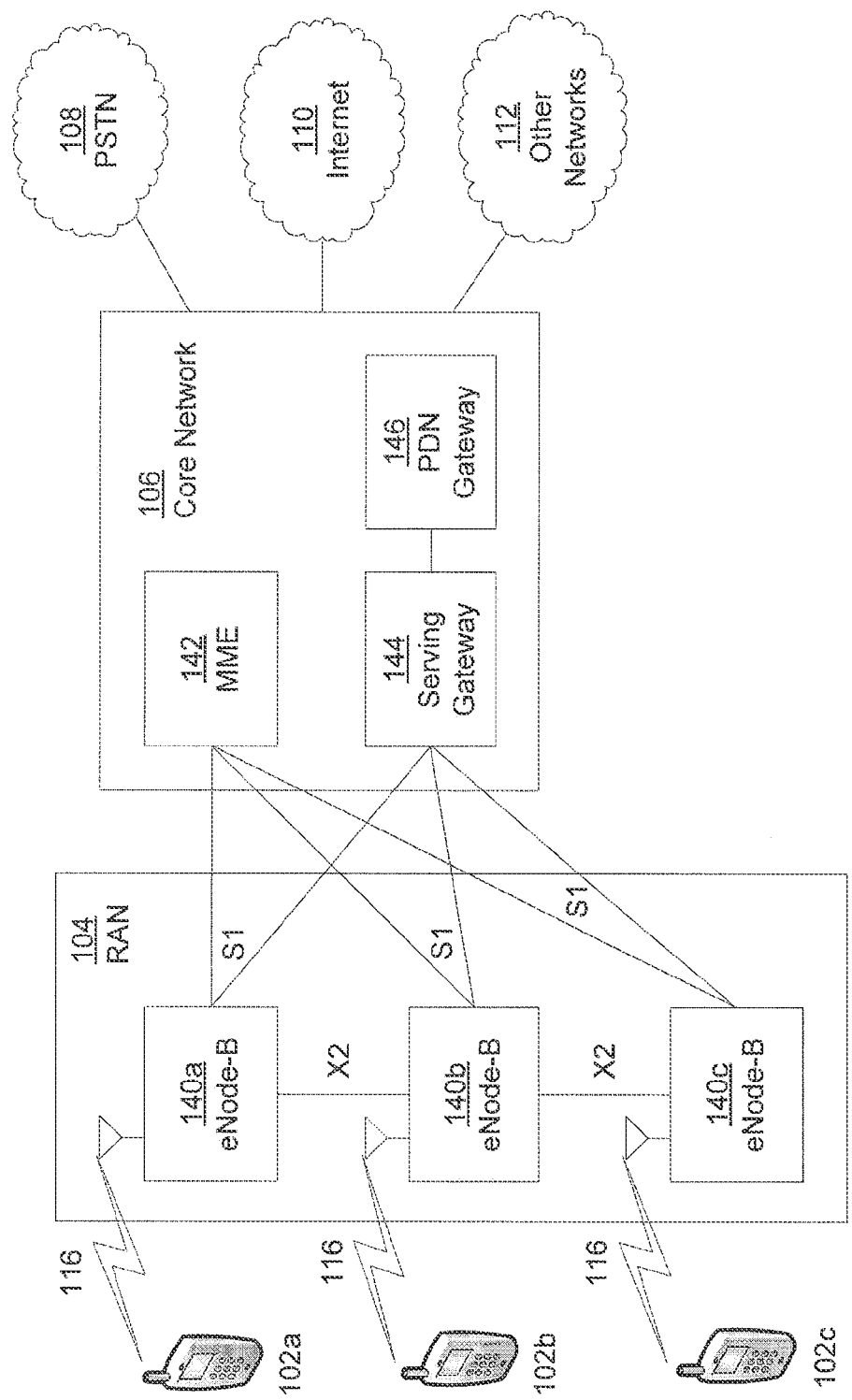

MAINTAINING TIME ALIGNMENT WITH MULTIPLE UPLINK CARRIERS

CROSS REFERENCE TO RELATED APPLICATIONS

This application is a continuation of U.S. patent application Ser. No. 12/986,549, titled "MAINTAINING TIME ALIGNMENT WITH MULTIPLE UPLINK CARRIERS", filed Jan. 7, 2011, which claims the benefit of U.S. Provisional Application No. 61/293,271, filed Jan. 8, 2010, titled "METHOD OF MAINTAINING TIME ALIGNMENT WITH MULTIPLE UPLINK CARRIERS", U.S. Provisional Application No. 61/320,449, filed Apr. 2, 2010, titled "METHOD AND APPARATUS FOR MAINTAINING TIME ALIGNMENT WITH MULTIPLE UPLINK CARRIERS", and U.S. Provisional Application No. 61/323,680, filed Apr. 13, 2010, titled "METHOD AND APPARATUS FOR MAINTAINING TIME ALIGNMENT WITH MULTIPLE UPLINK CARRIERS", the contents of all the aforementioned applications are hereby incorporated by reference as if set forth herein in their respective entirety, for all purposes.

BACKGROUND

In wireless communication systems, such as in an Long Term Evolution (LTE) wireless system, the network may configure the wireless transmit/receive unit (WTRU) with uplink (UL) and downlink (DL) resources on a single uplink (UL) and single downlink (DL) carrier respectively. In order to utilize these resources, the WTRU may be expected to be in sync with the network on these carriers.

Resources may need to be consumed to determine the synchronization and alignment status between the WTRU and the network via the single UL/DL carrier. More resources may be necessary to determine synchronization and alignment between the WTRU and the network where multiple uplink carriers may be available to the WTRU.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Disclosed herein are ways for maintaining time alignment with multiple carriers. A group of uplink carriers (UL CC sets) that operate with a single Timing Advance (TA) are determined, and a TA value may be applied to a specific UL CC set. A wireless transmit/receive unit's (WTRU's) capability of using multiple TAs may define a group index of a few bits for each UL CC set. A TA Command received in a Random Access Response message may be used to apply the TA value to each UL carrier of the UL CC set. The WTRU may determine which UL CC set the TA value applies to based on which DL carrier the command was received onto. The WTRU may determine which UL CC set the TA value applies to based on the Group Index being explicitly provided in the command. The WTRU may release multi-CC configurations upon a timeAlignmentTimer (TAT) expiry.

Embodiments contemplate a wireless transmit/receive unit (WTRU) that may be configured, at least in part, to identify one or more uplink carriers with which the WTRU may be capable of operating, or one or more uplink carriers that are operating on a wireless network. The WTRU may also be configured to determine one or more uplink component carrier sets (UL CC sets). Each of the UL CC sets may comprise one or more of the uplink carriers and each of the one or more uplink carriers that may comprise a respective UL CC set may be capable of operating with the same Timing Advance (TA). The WTRU may be configured to determine the one or more groups of UL CC sets based on a predetermined identification of which of the one or more uplink carriers may correspond to the one or more UL CC sets. For example, the predetermined identification may be received using dedicated signaling or may be inferred based on one or more properties of the respective UL CC sets. The WTRU may also be configured to select at least one UL CC set and identify at least one of the one or more uplink carriers that may be capable of random access channel (RACH) communication for the selected at least one UL CC set. The WTRU may be configured to initiate a RACH communication on at least one of the identified one or more uplink carriers for the selected at least one UL CC set and to receive a TA value in response to the RACH communication. The WTRU may be further configured to apply the TA value to each of the one or more uplink carriers that comprise the selected at least one UL CC set.

Embodiments contemplate that the selected at least one UL CC set may have an associated Time Alignment Timer (TAT) and the WTRU may be further configured to either start the TAT or restart the TAT. The WTRU may also be configured to receive a signal via a downlink carrier where the signal may include a TA value. The WTRU may identify at least one of the one or more uplink carriers that may be paired with the downlink carrier and identify at least one of the one or more UL CC sets that may correspond to the at least one of the one or more uplink carriers that may be paired with the downlink carrier. The WTRU may apply the TA value to each of the one or more uplink carriers that comprise the identified at least one of the one or more UL CC sets.

Embodiments contemplate that one or more UL CC sets may correspond a frequency band of their respective serving cell and the WTRU may be configured to receive a signal via a downlink carrier, where the signal may include a TA value. The WTRU may be configured to identify a frequency band corresponding to the downlink carrier and identify at least one of the one or more UL CC sets whose respective frequency band may correspond to the frequency band of the downlink carrier. The WTRU may apply the TA value to each of the one or more uplink carriers that may comprise the identified at least one of the one or more UL CC sets.

Embodiments contemplate that the a selected at least one UL CC set may includes at least one uplink carrier with a dedicated physical uplink control channel (PUCCH) configuration. A WTRU may be configured to cease transmitting on a resource corresponding to the PUCCH upon an expiration of the TAT. Alternatively or additionally, the WTRU may be configured to remove at least a part of the PUCCH configuration upon an expiration of the TAT. Also alternatively or additionally, the WTRU may be configured to remove one or more RACH resources from the configuration of the selected at least one UL CC set upon an expiration of the TAT.

Embodiments contemplate that a wireless network resource, such as an evolved Node B (eNodeB), may be configured, at least in part, to identify one or more uplink carriers with which the eNodeB may be capable of operating. The eNodeB may determine one or more indices. Each of the one or more indices may correspond respectively to one or more uplink component carrier sets (UL CC sets). Also, each of the UL CC sets may comprise one or more of the uplink carriers, and each of the one or more uplink carriers that comprise a respective UL CC set may be capable of operating with the same Timing Advance (TA). The eNodeB may be configured to transmit the one or more indices.

Embodiments contemplate that the eNodeB may be configured to receive a RACH communication on at least one of the one or more uplink carriers that comprise at least one of the one or more UL CC sets. The eNodeB may transmit a TA value in response to the RACH communication. The TA value may be applicable to each of the one or more uplink carriers that comprise the at least one of the one or more UL CC sets. The eNode B may be configured to transmit a signal, where the signal may include a TA value and an indicator. The indicator may indicate at least one of the one or more UL CC sets to which the TA value may be applicable. The eNodeB may be configured to receive a RACH communication on at least one of the one or more uplink carriers of the UL CC set and may transmit a TA value in response to the RACH communication. The TA value may be applicable to each of the one or more uplink carriers that comprise the UL CC set. Alternatively or additionally, the eNode B may be configured to transmit a signal, where the signal may include a TA value and an indicator. The indicator may indicate the UL CC set to which the TA value may be applicable.

Embodiments contemplate that a wireless transmit/receive unit (WTRU), may comprise a processor that may be configured to determine one or more sets of serving cells. Each of the one or more sets of serving cells may include at least one serving cell with a configured uplink component carrier (UL CC sets). Each of the UL CC sets may be respectively associated with a group index of one or more group indices. Each UL CC set of the one or more UL CC sets may respectively include one or more uplink carriers that may be associated with the same group index with which the UL CC set is associated. Each of the one or more uplink carriers that may be included in a respective UL CC set may be configured to operate with the same Timing Advance (TA) of one or more Timing Advances (TAs). Each of the UL CC sets may have a respectively associated reference carrier providing a TA of the one or more TAs. The processor may be configured to receive a first TA value via a first reference carrier. The first reference carrier may be associated with a first UL CC set. The processor may be configured to apply the first TA value to the one or more uplink carriers that may be included in the first UL CC set.

BRIEF DESCRIPTION OF THE DRAWINGS

A more detailed understanding may be had from the following description, given by way of example in conjunction with the accompanying drawings wherein:

FIG. 1C is a system diagram of an example radio access network and an example core network that may be used within the communications system illustrated in FIG. 1A;

DETAILED DESCRIPTION OF ILLUSTRATIVE EMBODIMENTS

Figure 1A:
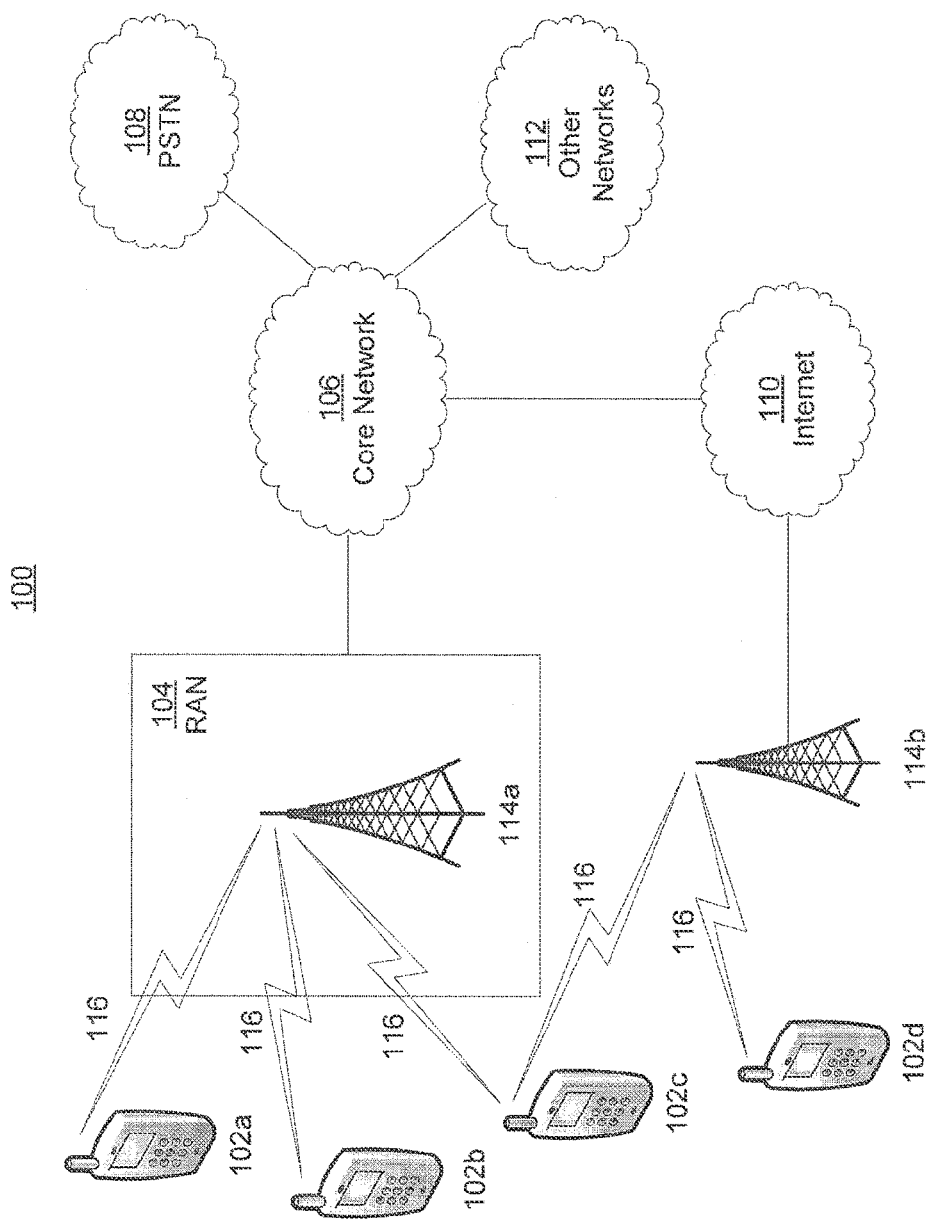
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
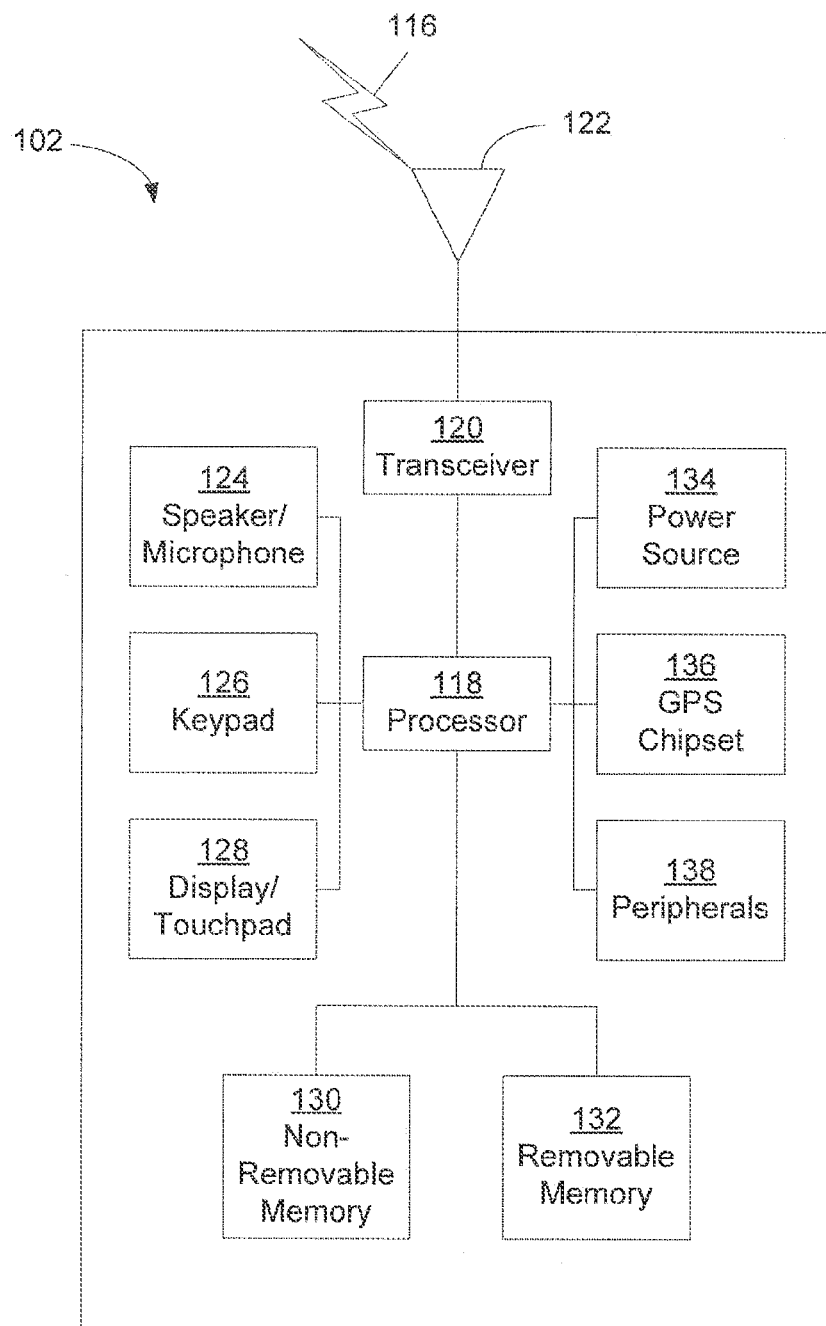
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 104 and the core network 106 according to an embodiment. As noted above, the RAN 104 may employ an E-UTRA radio technology to communicate with the WTRUs 102a, 102b, and/or 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface. The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to hereafter, the term primary component carrier (PCC) includes, without loss of generality, a carrier of a WTRU configured to operate with multiple component carriers for which some functionality, such as for example, derivation of security parameters and NAS information, may be applicable only to that component carrier. The WTRU may be configured with at least one PCC for the downlink (DL PCC) and one for the uplink (UL PCC). Consequently, a carrier which is not a PCC of the WTRU may hereafter be referred to as a Secondary Carrier (SCC).

The DL PCC may, for example, correspond to the CC used by the WTRU to derive initial security parameters when initially accessing the system. The UL PCC may, for example, correspond to the CC whose PUCCH resources are configured to carry all Hybrid Automatic Repeat Request (HARQ) Acknowledge/Negative Acknowledge (A/N) and Channel State Information (CSI) feedback for a given WTRU.

When referred to herein, the term "Component Carrier (CC)" includes, without loss of generality, a frequency on which the WTRU operates. For example, a WTRU may receive transmissions on a downlink CC (hereafter "DL CC"); a DL CC may comprise of a number of DL physical channels including, but not limited to, the Physical Control Format Indicator Channel (PCFICH), the Physical HARQ Indicator Channel (PHICH), the Physical Downlink Control Channel (PDCCH), the physical multicast data channel (PMCH) and the Physical Downlink Shared Channel (PDSCH). On the PCFICH, the WTRU receives control data indicating the size of the control region of the DL CC. On the PHICH, the WTRU receives control data indicating HARQ ACK/NACK feedback for a previous uplink transmission. On the PDCCH, the WTRU receives downlink control information (DCIs) messages mainly used for the purpose of scheduling of downlink and uplink resources. On the PDSCH, the WTRU receives user and/or control data. For example, a WTRU may transmit on an uplink CC (hereafter "UL CC"); a UL CC may comprise of a number of UL physical channels including, but not limited to, the physical uplink control channel (PUCCH) and the physical uplink shared channel (PUSCH). On the PUSCH, the WTRU transmits user and/or control data. On the PUCCH, and in some case on the PUSCH, the WTRU transmits uplink control information (such as CQI/PMI/RI or SR) and/or hybrid automatic repeat request (HARQ) acknowledgement/negative acknowledgement (ACK/NACK) feedback. On a UL CC, the WTRU may also be allocated dedicated resources for transmission of Sounding and Reference Signals (SRS).

A cell typically minimally consists in a DL CC which is, in some embodiments, linked to a UL CC based on the system information (SI) received by the WTRU either broadcasted on the DL CC or possibly using dedicated configuration signaling from the network. For example, when broadcasted on the DL CC, the WTRU receives the uplink frequency and bandwidth of the linked UL CC as part of the SystemInformationBlockType2 (SIB2) information element.

When referred to herein, the term "Primary Cell (PCell)" includes, without loss of generality, the cell operating of the primary frequency in which the WTRU either performs the initial connection establishment procedure or initiates the connection re-establishment procedure, or the cell indicated as the primary cell in the handover procedure. The WTRU uses the PCell to derive the parameters for the security functions and for upper layer system information such as NAS mobility information. Other functions that may be supported only on the PCell DL include system information (SI) acquisition and change monitoring procedures on the broadcast channel (BCCH), and paging. The UL CC of the PCell may correspond to the CC whose physical uplink control channel (PUCCH) resources are configured to carry all HARQ ACK/NACK feedback for a given WTRU.

When referred to herein, the term "Secondary Cell (SCell)" includes, without loss of generality, the cell operating on a secondary frequency which may be configured once an RRC connection is established and which may be used to provide additional radio resources. System information relevant for operation in the concerned SCell is typically provided using dedicated signaling when the SCell is added to the WTRU's configuration. Although the parameters may have different values than those broadcasted on the downlink of the concerned SCell using the system information (SI) signaling, this information is herein referred to as SI of the concerned SCell independently of the method used by the WTRU to acquire this information.

When referred to herein, the terms "PCell DL" and "PCell UL" corresponds to, without loss of generality, the DL CC and the UL CC of the PCell, respectively. Similarly, the terms "SCell DL" and "SCell UL" corresponds to the DL CC and the UL CC (if configured) of a SCell, respectively. For the PCell, a CC may also be referred to as a PCC; for a SCell, a CC may be referred to as a SCC.

When referred to herein, the term "serving cell" includes, without loss of generality, a primary cell (e.g., a PCell) or a secondary cell (e.g., a SCell). More specifically, for a WTRU that is not configured with any SCell or that does not support operation on multiple component carriers (e.g., carrier aggregation), there is one serving cell comprising of the PCell, and in some embodiments perhaps there is only one serving cell comprising of the PCell; for a WTRU that is configured with at least one SCell, the term "serving cells" includes the set of one or more cells comprising of the PCell and all configured SCell(s).

When a WTRU is configured with at least one SCell, there is at least one PCell DL (e.g. including one DL-SCH) and at least one PCell UL (e.g., including one UL-SCH) and, for each configured SCell, there is at least one SCell DL and, in some embodiments, at least one SCell UL (if configured). In some embodiments, there is always one PCell DL (e.g. including one DL-SCH) and one PCell UL (e.g., including one UL-SCH) and, for each configured SCell, there is one SCell DL and, in some embodiments, one SCell UL (if configured).

For R10 with Carrier Aggregation (CA), e.g., the WTRU has at least one SCell DL in its configuration, the WTRU may also be configured with one or more explicit resource allocations for A/N on PUCCH. In some embodiments, by way of example and not limitation, working assumptions are made that include that PUCCH A/N resources may be explicitly allocated for the UL PCC, for example using dedicated signaling; UL/DL PCC linking may be based on SI on DL PCC; SCell may be explicitly (de)activated; and a WTRU may perform RA in a SCC (e.g., RA-SR).

UL synchronization may be initially achieved using a random access channel (RACH) procedure, and the WTRU is considered to be UL Time Aligned with the network. The WTRU has a configurable timer, e.g., timeAlignmentTimer (TAT) that may be used to maintain timing alignment with the network. A Release 8/Release 9 (R8/R9) WTRU releases a configured physical uplink control channel (PUCCH) resources for Channel Quality Information/Precoding Matrix Indicator/Rank Indicator (CQI/PMI/RI), and also a sounding reference symbol (SRS) when the WTRU has no valid Timing Advance, e.g., upon expiration of TA Timer. For PUCCH resources for transmission of HARQ ACK/NACK (A/N), which are dynamically allocated, when TAT is not running the WTRU is not allowed to transmit A/N on PUCCH. For HARQ feedback on PUCCH, the resource on which to transmit on PUCCH is determined dynamically based on the first Control Channel Element (CCE) of the DCI for the downlink (DL) assignment received on a physical downlink control channel (PDCCH).

A WTRU may be configured to operate with multiple carriers in the connected mode. WTRU configuration may include more than one serving cell with configured uplink resources, which corresponding uplink carriers may possibly be grouped based on similar timing alignment requirement in case the WTRU supports uplink carriers requiring different Timing Advance. In such a scenario, the WTRU may need to establish a valid Timing Alignment for each of these (groups of) carriers. One issue may be how the WTRU and the network agree on which uplink carriers should share the same Timing Advance (TA). For purpose of example, and not limitation, the TA may be the variable that controls an adjustment of the time at which a WTRU may be allowed to transmit within allotted timeslots. Another issue may be how the network communicates the TA values associated with these uplink carriers, or groups thereof, to the WTRU. Yet another issue may be determining what actions need to be taken by the WTRU when loss of synchronization occurs due to expiration of the timing advance timer for each uplink carrier, or a group thereof. Another issue may be how a WTRU, configured for multicarrier operation, handles: (1) PUCCH A/N resources when TAT is expired for the UL CC on which the resources are configured, for example the PCell UL; and (2) SCell DLs when TAT is expired for the linked SCell UL.

Embodiments contemplate that a WTRU may transmit an A/N for the first scheduled PDSCH transmission, e.g. a PDSCH assignment that is scheduled either using PDCCH scrambled with C-RNTI, or otherwise on DL-SCH including the WTRU Contention Resolution Medium Access Control (MAC) control element (CE), after receiving a RAR message. A RAR message may include a TA Command and may restart TAT during a RA procedure. If TAT expiry invalidates, for example, the R10 PUCCH A/N resource, a rule may be required for A/N transmission for PDSCH received in a SCell DL, or else a different mechanism may be needed to implicitly release the R10 PUCCH A/N resources such that the A/N may be sent on the Physical Uplink Control Channel PUCCH dynamic resource according to R8 principles to ensure compatibility.

Embodiments contemplate methods and techniques disclosed herein that may facilitate a WTRU to operate with multiple carriers in the connected mode and may also maintain time alignment with multiple uplink carriers.

Embodiments contemplate that the Timing Advance (TA) value used by the WTRU for UL time alignment may be provided by the network in the Random Access Channel (RACH) response to the WTRU's RACH request message, or by using a Timing Advance Command MAC Control Element. The WTRU may use the TA value for UL time alignment. The WTRU may start/restart the TAT associated with the UL carrier because there may be one UL carrier assigned to the WTRU. In some instances, the WTRU may be constrained by its implementation to operate with a single TA for a group of UL carriers that it may be operating with at a given time. This may be the case if, for example, the UL carriers are within the same frequency band and are transmitted using a common RF module. A group of carriers operating with the same TA may be referred to herein as a "UL CC set".

Embodiments contemplate that UL CC sets that may require minimum signaling may include determining that or one or more UL carriers that are a part of the same frequency band, are part of the same UL CC set. Those UL carriers that are not part of the same frequency band may not be part of the same UL CC set. Also, embodiments contemplate that the WTRU and the network may know in advance which UL carriers belong to the same UL CC set.

Embodiments contemplate that the definition of a UL CC set may depend on the WTRU capability. The WTRU, therefore, may transmit information as part of its E-UTRA capabilities to the network including which UL carriers may be transmitted with different TAs. Since the possibility of being able to operate with multiple TAs may be linked to the frequency bands the WTRU is supporting, defining the capability as a single information element ("multipleTAsupport") may be used to transfer this information to the network. An example encoding may be:

Codepoint 0: WTRU is not capable of supporting multiple TAs;

Codepoint 1: WTRU is capable of operating with different TAs if UL carriers are not in same band; and Codepoint 2: WTRU is fully capable of operating with different TAs for any pair of UL carriers. Also by way of example, another contemplated encoding may be:

Codepoint 0: WTRU is not capable of supporting multiple TAs (e.g. single radio front end supporting a single frequency band);

Codepoint 1: WTRU is capable of operating with up to two different TAs if UL carriers are not in same band (e.g. dual radio front ends, each supporting a single frequency band); and Codepoint 2: WTRU is fully capable of operating with different TAs for any number of UL carriers (e.g. full support for any combination of frequency band(s) according to the reported WTRU's capabilities and WTRU's class).

Using the encoded information, the network may define sets of UL carriers that use the same timing advance (UL CC sets), and provide the information to the WTRU. The network may include UL carriers from different bands in the same UL CC set even if the WTRU is capable of operating with different TAs for UL carriers in different bands.

Some embodiments may identify UL carriers that use the same timing advance by defining a group index of a few bits for each UL CC set (possibly a single bit if there is a maximum of 2 UL CC sets). The WTRU may obtain the group index of the UL CC set to which an UL carrier belongs when this UL carrier is being configured by the network (e.g., in the RRC message). Alternatively, the group index may be broadcast in the system information of a paired DL carrier. In another alternative, a group index may be associated with a frequency band if the operation with multiple timing advances within a band is not supported.

The WTRU may also obtain the DL carrier (or set of DL carriers) that may be used as a reference for the timing advance for each UL carrier or UL CC set. The DL carrier, alternatively, that may be used as a reference for the timing advance may be implicitly the DL carrier from which the message including the timing advance value is transmitted.

Embodiments contemplate that a WTRU may apply different TA values for different UL CC sets. Each UL CC set may operate with a separate Time Alignment Timer (TAT). In accordance with this method, in one embodiment, initial timing alignment may be achieved using a Random Access Channel (RACH) procedure wherein the TA value may be provided by the network to the WTRU using the RACH response message. In case of an UL CC set where all the carriers (or a subset) of the set are configured for RACH, the WTRU may select one of the carriers that can be used for RACH and trigger the Random Access procedure. The Timing Advance Command received in the Random Access Response message may then be used to apply the TA value to some or each UL carrier of the UL CC set, and the WTRU may start/restart the TAT associated with the UL CC set.

In some embodiments only one carrier in the UL CC set may be configured for RACH. In such embodiments, the WTRU may trigger the Random Access procedure on this carrier, apply the TA value obtained in the corresponding Random Access Response message to each UL carrier of the UL CC set, and start/restart the TAT associated with the UL CC set.

In other embodiments, the timing alignment may be maintained by the WTRU based on the TA value received from the network through either an existing MAC CE or any other form of signaling. The WTRU may determine which UL CC set the TA value may apply to based on from which DL carrier the command (for example, a Timing advance command MAC control element) was transmitted. For example, the UL CC set the TA value applies may be determined as the one to which the UL carrier paired to this DL carrier belongs. In case a UL CC set corresponds to a frequency band, the TA value may apply to the UL CC set in the same band as the DL carrier from which the command is transmitted. Alternatively, the correspondence between a DL carrier and an UL CC set may be explicitly signaled.

Embodiments contemplate that a frequency band may be defined for a serving cell, e.g., may be defined jointly for a DL carrier and, in some embodiments, a UL carrier forming the serving cell. Also the Timing advance may be applied for some or all UL carriers of serving cells that correspond to the same frequency band. Embodiments contemplate at least two techniques to identify the applicable band for the time alignment command (TAC). The applicable band may or may not be bound to the reception of the TAC in a specific downlink carrier which may itself be part of the same frequency band. Embodiments contemplate that the TAC may be received and applied for some or all UL carriers of the frequency band of the carrier on which it is received (e.g., implicit identification of the applicable band). Alternatively or additionally, the TAC may be received anywhere and applied to all UL carriers of the frequency band that may be indicated inside the TAC itself (e.g., explicit identification of the applicable band).

Embodiments contemplate a MAC CE, that may include a TA, may be received on the DL of a serving cell. The WTRU may determine what UL CC set the serving cell's corresponding UL CC may belong to. The WTRU may apply the received TA to the UL CC of all of the serving cell (and/or to all UL CCs) that may belong to determined UL CC set. Embodiments contemplate that the paring of an UL CC with a DL CC may be unique (e.g., 1 UL for 1 DL). Embodiments also contemplate that the pairs may be part of a set, where the criteria for being part of a set may be that all UL CCs of a set have the same TA requirement.

Alternatively, the WTRU may determine which UL CC set the TA value applies to based on the Group Index that may be explicitly provided in the command. For example, the two spare bits of the existing "Timing Advance Command MAC Control Element" may be used, or a new type of MAC control element including the group index may be defined. When a Timing Advance Command MAC CE is received, the WTRU may identify the UL CC set using the Group Index and may start/restart the TAT for the corresponding UL CC set.

Alternatively, the network may use any other form of dedicated signaling to provide the WTRU with the TA value. The network may embed the CC "group index" in this message to indicate which UL CC set may be associated with this TA value.

Again alternatively, for applying the TA value to a specific UL CC set upon expiration of an UL CC set's TAT, the WTRU may follow the same procedure as initial TA establishment as described previously to re-establish UL timing alignment. Re-acquiring the TA may be done if and when necessary. Alternatively, the WTRU may determine based on the group index provided in dedicated signaling which RACH resources to use to re-establish the corresponding UL CC set's TA. The WTRU may then repeat the Random Access procedure as described above.

In another alternative, the network may use the existing Timing Advance Command MAC CE, or any other form of dedicated signaling, to provide the TA value previously used for the corresponding UL CC set. The network may use this mechanism within a reasonable amount of time (a new timer can be defined for this) after the expiration of the TAT. The WTRU may then use this TA value to start/restart the corresponding TAT without performing an RA procedure for this UL CC set.

Upon expiration of the TAT for a specific UL CC set (or for all configured UL CC's in case where there is a single TAT), the WTRU may flush all HARQ buffers corresponding to the UL-SCH of an UL carrier part of the UL CC set.

Corresponding local NACKs may also be indicated to the RLC sub-layer. Any Physical Uplink Control Channels (PUCCH) or SRS configuration of a UL carrier which is part of the UL CC set may be released upon expiration of the TAT. For any DL carrier for which feedback is transmitted over such PUCCH, the WTRU may perform at least one of the following, except for a specific DL carrier, such as the PCell DL. The WTRU may: stop PDSCH processing (e.g., buffering/decoding) for this DL carrier, de-activate the DL carrier, release the PDSCH configuration for this DL carrier, release the PDCCH configuration for this DL carrier, release the PRACH configuration applicable to this DL carrier, and/or release any part of the configuration pertaining to the DL carrier.

Any uplink grant applicable to an UL carrier part of the UL CC set may be cleared upon expiration. In addition, any downlink assignment for which feedback may be provided on resources corresponding to an UL carrier which may be part of the UL CC set may be cleared.

The PUSCH configuration on a UL carrier which is part of the UL CC set may be released. This, however, may not apply to certain UL carrier(s), such as the PCell UL.

The PUSCH on a UL carrier which is part of the UL CC set may be deactivated. This however, may not apply to certain UL carrier(s), such as the PCell UL. The PUSCH on these carriers could be reactivated upon subsequent reception of a timing advance command applicable to the UL CC set.

A PUCCH configuration that may be received using dedicated signaling, for example, an R10 configuration for an explicit resource allocation for HARQ A/N and/or for CQI/PMI/RI for control information corresponding to multiple DL CCs, of an UL CC (e.g. a PCell UL) of a WTRU's configuration which is part of the UL CC set may be invalidated. For example, the WTRU may maintain (at least part of) the dedicated PUCCH configuration but may not transmit on a resource corresponding to the configuration, possibly until the WTRU has a valid timing advance for the UL CC. This may be because of TAT expiry for PCell UL, and the WTRU may invalidate/remove PUCCH A/N on PCell UL and revert to R8/9 A/N behavior. The WTRU may revert to dynamic selection of A/N resource for HARQ feedback transmitted in the UL CC (e.g., the PCC); and/or the WTRU may stop transmission of CQI/PMI/RI on the PUCCH resources for CQI/PMI/RI.

A PUCCH configuration that may be received using dedicated signaling may also be released, e.g., the WTRU may completely remove, or remove at least a part of, the dedicated PUCCH configuration. For example, an R10 configuration for an explicit resource allocation for HARQ A/N and/or for CQI/PMI/RI for control information corresponding to multiple DL CCs, of an UL CC (e.g. a PCell UL) of a WTRU's configuration which is part of the UL CC set may be released. The WTRU may revert to dynamic selection of A/N resource for HARQ feedback transmitted in the UL CC (e.g., the PCC); and/or the WTRU may stop transmission of QI/PMI/RI on the PUCCH resources for CQI/PMI/RI.

As an example, upon TAT expiry of the PCell UL, the WTRU may invalidate the R10 explicit PUCCH A/N resource allocation and/or release the R10 PUCCH configuration for CQI/PMI/RI of the PCell UL.

Because of TAT expiry for a SCell UL with a PUCCH configuration (perhaps assuming PUCCH and PCC are decoupled and PCell UL may be defined based on PCell DL), the WTRU may switch to a PUCCH configuration of the PCell UL. A dedicated PUCCH configuration (R10 configuration for HARQ A/N and/or for CQI/PMI/RI for control information corresponding to multiple DL CCs) of a UL CC (e.g., a PCell UL) of the WTRUs configuration, which UL CC is still considered time aligned (e.g., the UL CC is not part of the UL CC set for which TA is no longer valid), may be reconfigured. For example, the WTRU may select a different resource from its PUCCH A/N configuration such that a WTRU transmits uplink control information on the reconfigured resource on the UL CC which still may have valid TA (e.g., a PCell UL). Also by way of example, this may be considered equivalent to switching between a configured resource (e.g., for A/N) on a first UL CC to a configured resource on a second UL CC (e.g., a PCell UL) upon loss of TA for the first UL CC, or using a different dedicated resource (e.g., for CQI/PMI/RI) on e.g., a PCC upon expiration of TA (and possibly implicit deactivation) for one or more SCells.

Because of TAT expiry, the WTRU may only be allowed to perform RACH for PCell DL. Embodiments contemplate that the WTRU may invalidate and/or remove the RACH resources from its configuration, which resources correspond to an SCell UL which is part of the UL CC set for which TA may no longer be valid. In other words, in some embodiments, the WTRU may only initiate random access (RACH) on a UL/DL CC pair (e.g., the PCell) using single carrier operation according to R8/9 selection and transmission principles.

Also because of TAT expiry, the WTRU may later regain a valid TA, it may revert to R8/9 of all UL/DL CC pairs of its configuration. The WTRU may revert to a R8/9 behavior for A/N transmissions on PUCCH when it subsequently recovers a valid TA for the UL CC, transmitting on a PUCCH resource of the UL CC which resource is determined based on at least one of: the UL/DL linking of the DL CC in which it successfully decodes a PDCCH for a DL assignment; or using a resource in the PUCCH region either broadcasted in the SI of the corresponding DL CC (e.g., for a PCC) or received in a dedicated manner (e.g., for a SCC).

As an example, upon TAT expiry a WTRU may keep its multicarrier configuration including resources for performing random access in a SCell of its configuration; in this case, for each CC pair (e.g. either a PCell or a SCell pair of the WTRU's configuration) the WTRU may apply Rel-8/9 behavior for A/N transmission on PUCCH once it recovers a valid TA, e.g., when receiving a TA Command during the random access procedure.

Embodiments contemplate that a WTRU may revert to a single carrier (e.g., R8/9) operation: where the serving cell may correspond to the downlink primary carrier (e.g., PCell) prior to the timer expiry; or if the WTRU has no valid time alignment for any UL CC set (e.g., no timing advance timer is running).

All of the methods as described above may be applicable to TAT expiry, and also may be equally applicable for implicit SCell deactivation (A/N and CQI). The above methods may also be applicable upon deactivation of an SCell (either explicit, or implicit, e.g., using a timer different than the TAT but with similar properties in that it forbids a WTRU to use uplink resources corresponding to the deactivated SCell) or explicit reconfiguration which removes a UL CC (e.g. a SCell UL) of the WTRUs configuration.

In addition, for methods above where the WTRU may revert to R8/9 behavior for transmission of A/N on PUCCH (e.g., dynamic selection of PUCCH resource). For example, a TAT may expire and the WTRU may have a configuration including at least one SCell DL, it may not be possible for the WTRU to transmit HARQ A/N feedback and/or CQI/PMI/RI for more than one DL CC (e.g., a WTRU may have multiple DL CCs and end up in a situation where it may only use a single R8/9 PUCCH resource for A/N during a RACH procedure) until it first recovers the means to transmit uplink control information for more than one carrier in a subframe, e.g., until it is reconfigured. In particular if a WTRU may only transmit A/N feedback in a single UL CC (e.g., the PCell UL) during the random access procedure. For random access, reconfiguration may happen no earlier than upon reception of RA "msg4" for contention-based RA, or no earlier than the first PDSCH assignment following reception of RA "msg2" in case of contention-free RA.

Embodiments contemplate that, where a WTRU receives more than one DL assignment in a given subframe (the WTRU may successfully decode multiple PDCCH in a given subframe), the WTRU, which may consider the PDSCH of the PCell DL, may generate A/N feedback according to the DL transmission received on the PCell DL only.

In case where a WTRU receives more than one DL assignment in a given subframe (the WTRU may successfully decode multiple PDCCH in a given subframe), the WTRU, which may consider the PDSCH of the DL CC used for the ongoing RACH procedure, may generate A/N feedback for the DL transmission received on the DL CC associated/linked to the UL CC used for transmission of RA msg1 (e.g., a RACH preamble) and/or for transmission of RA msg3 (e.g., a transmission using the resources granted in a RA Response previously received).

For any of the embodiments described previously, the WTRU may (for A/N feedback) either transmit on a PUCCH resource on a PCell UL according to R8/9 selection and transmission or the WTRU may transmit R8/9 A/N on PCell UL. The WTRU may also transmit on a PUCCH resource on the UL CC associated/linked to the DL CC for which the A/N feedback was generated, according to R8/9 selection and transmission; or transmit R8/9 A/N on the linked SCell UL; or the WTRU may refrain from transmission, e.g., the WTRU may not transmit any feedback, and possibly may ignore the received DL assignment or may consider this as an error situation.

Methods are disclosed for maintaining time alignment with multiple uplink carriers that include determining that all UL carriers part of the same frequency band are part of the same UL CC set. The WTRU signals capability of using multiple TAs by defining a group index of a few bits for each UL CC set. The Timing Advance Command received in the Random Access Response message is used to apply the TA value to each UL carrier of the UL CC set. The WTRU may determine which UL CC set the TA value applies to based on which DL carrier the command was transmitted from, for example by way of a Timing advance command MAC control element. The WTRU may determine which UL CC set the TA value applies to based on the Group Index being explicitly provided in the command. The WTRU releases at least a part of a multicarrier configuration (e.g., the configuration of one or more SCells) upon TAT expiry. For example, the WTRU may release the configuration for all SCells for which the respective SCell UL is part of the UL CC set for which the timing alignment is no longer valid. Alternatively, for example, the WTRU may release the configuration for all SCells when the timing alignment of the PCell is no longer valid.

It should be understood that any of the embodiments described herein directed to the function or capability of the WTRU and/or a base node (or base station or eNodeB) may be implemented by one or more processors configured to perform the disclosed function or capability. For example, the processor 118 described with regard to FIG. 1B may be configured to perform some or all of the various WTRU functions and capabilities disclosed herein, in whole or in part. Also by way of example, a processor included in an base station (base node) or eNodeB described with regard to FIG. 1C may be configured to perform some or all of the various base node or eNodeB functions and capabilities disclosed herein, in whole or in part.

Figure 2:
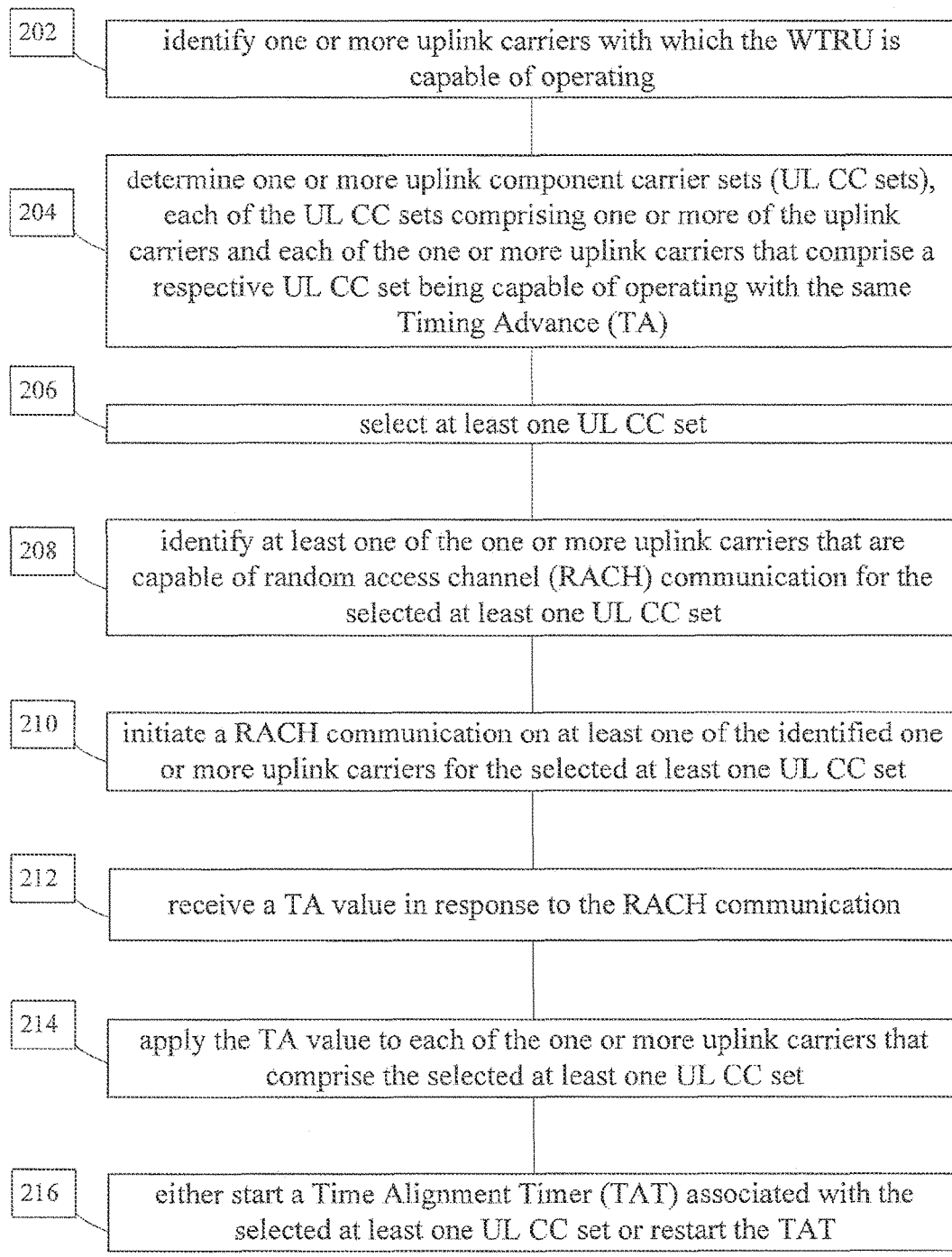
FIG. 2 illustrates a flow chart of an exemplary method consistent with embodiments.

In FIG. 2, exemplary embodiments contemplate a wireless transmit/receive unit (WTRU) that may be configured, at least in part, to, at 202, identify one or more uplink carriers with which the WTRU may be capable of operating, or one or more uplink carriers that may be operating on a wireless communication network. At 204, the WTRU may also be configured to determine one or more uplink component carrier sets (UL CC sets). Each of the UL CC sets may comprise one or more of the uplink carriers and each of the one or more uplink carriers that may comprise a respective UL CC set may be capable of operating with the same Timing Advance (TA). The WTRU may be configured to determine the one or more groups of UL CC sets based on a predetermined identification of which of the one or more uplink carriers may correspond to the one or more UL CC sets. At 206, the WTRU may also be configured to select at least one UL CC set and, at 208, identify at least one of the one or more uplink carriers that may be capable of random access channel (RACH) communication for the selected at least one UL CC set. At 210, the WTRU may be configured to initiate a RACH communication on at least one of the identified one or more uplink carriers for the selected at least one UL CC set and, at 212, to receive a TA value in response to the RACH communication. The WTRU may be further configured, at 214, to apply the TA value to each of the one or more uplink carriers that comprise the selected at least one UL CC set.

Figure 3:
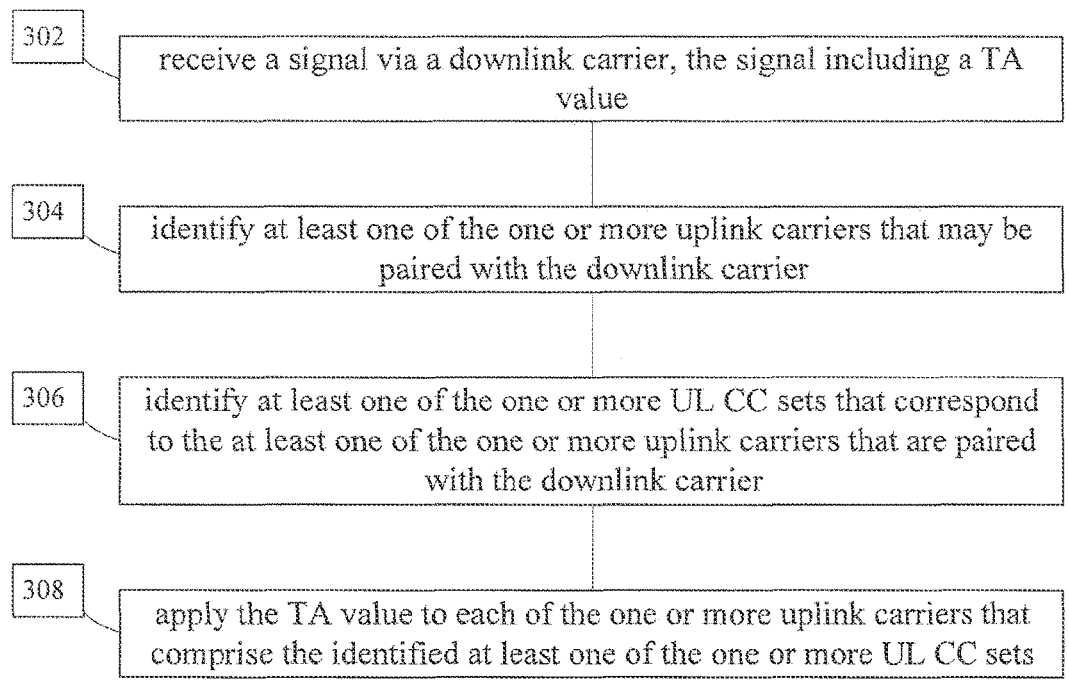
FIG. 3 illustrates a flow chart of an exemplary method consistent with embodiments.

Embodiments contemplate that the selected at least one UL CC set may have an associated Time Alignment Timer (TAT) and, at 216, the WTRU may be further configured to either start the TAT or restart the TAT. Referring to FIG. 3, the WTRU may also be configured, at 302, to receive a signal via a downlink carrier where the signal may include a TA value. The WTRU may, at 304, identify at least one of the one or more uplink carriers that may be paired with the downlink carrier and, at 306, identify at least one of the one or more UL CC sets that may correspond to the at least one of the one or more uplink carriers that may be paired with the downlink carrier. The WTRU may, at 308, apply the TA value to each of the one or more uplink carriers that comprise the identified at least one of the one or more UL CC sets.

Figure 4:
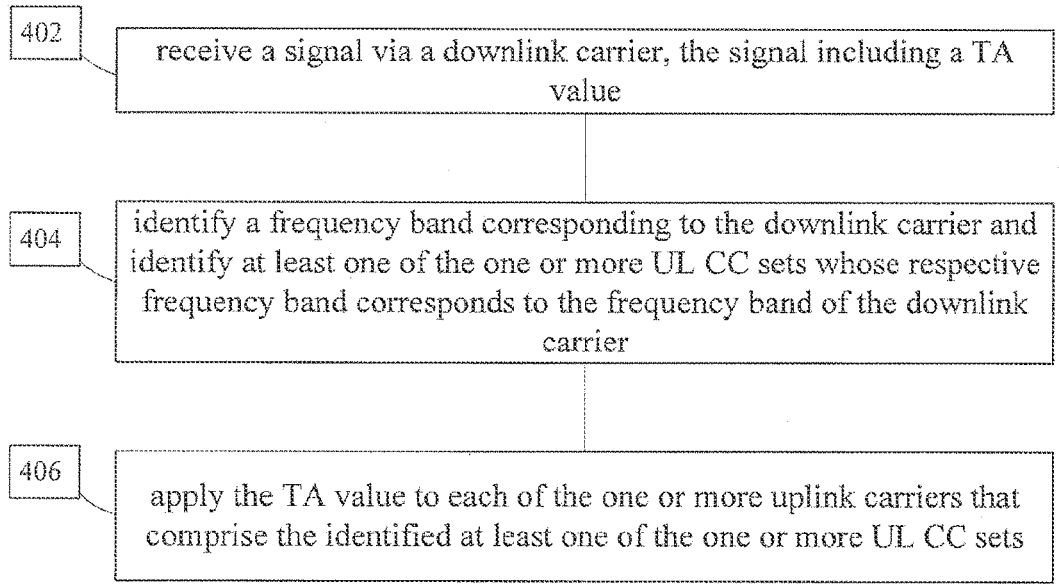
FIG. 4 illustrates a flow chart of an exemplary method consistent with embodiments.

Referring to FIG. 4, embodiments contemplate that one or more UL CC sets may correspond to respective frequency bands and the WTRU may be configured, at 402, to receive a signal via a downlink carrier, where the signal may include a TA value. The WTRU may be configured, at 404, to identify a frequency band corresponding to the downlink carrier and identify at least one of the one or more UL CC sets whose respective frequency band may correspond to the frequency band of the downlink carrier. The WTRU may, at 406, apply the TA value to each of the one or more uplink carriers that may comprise the identified at least one of the one or more UL CC sets.

Figure 5:
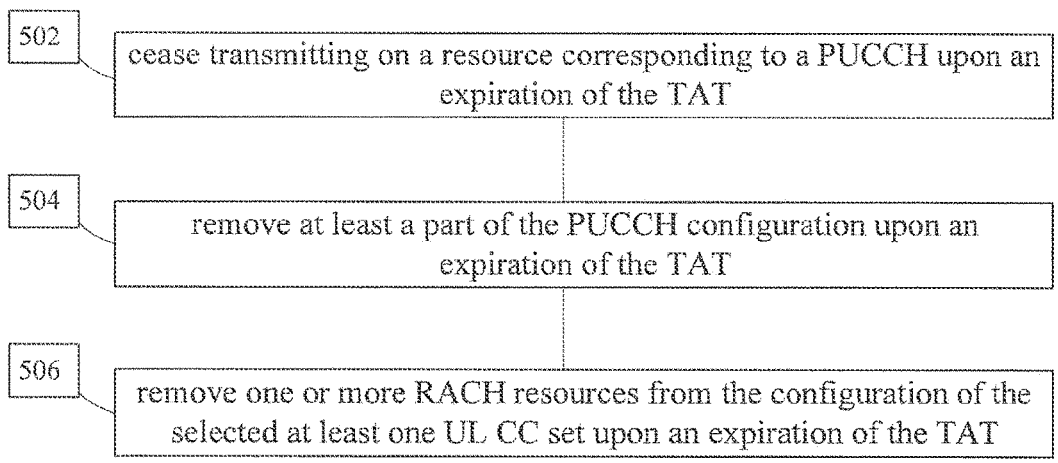
FIG. 5 illustrates a flow chart of an exemplary method consistent with embodiments.

Referring to FIG. 5, embodiments contemplate that the a selected at least one UL CC set may includes at least one uplink carrier with a dedicated physical uplink control channel (PUCCH) configuration. A WTRU may be, at 502, configured to cease transmitting on a resource corresponding to the PUCCH upon an expiration of the TAT. Alternatively or additionally, the WTRU may be, at 504, configured to remove at least a part of the PUCHH configuration upon an expiration of the TAT. Also alternatively or additionally, the WTRU may be, at 506, configured to remove one or more RACH resources from the configuration of the selected at least one UL CC set upon an expiration of the TAT.

Figure 6:
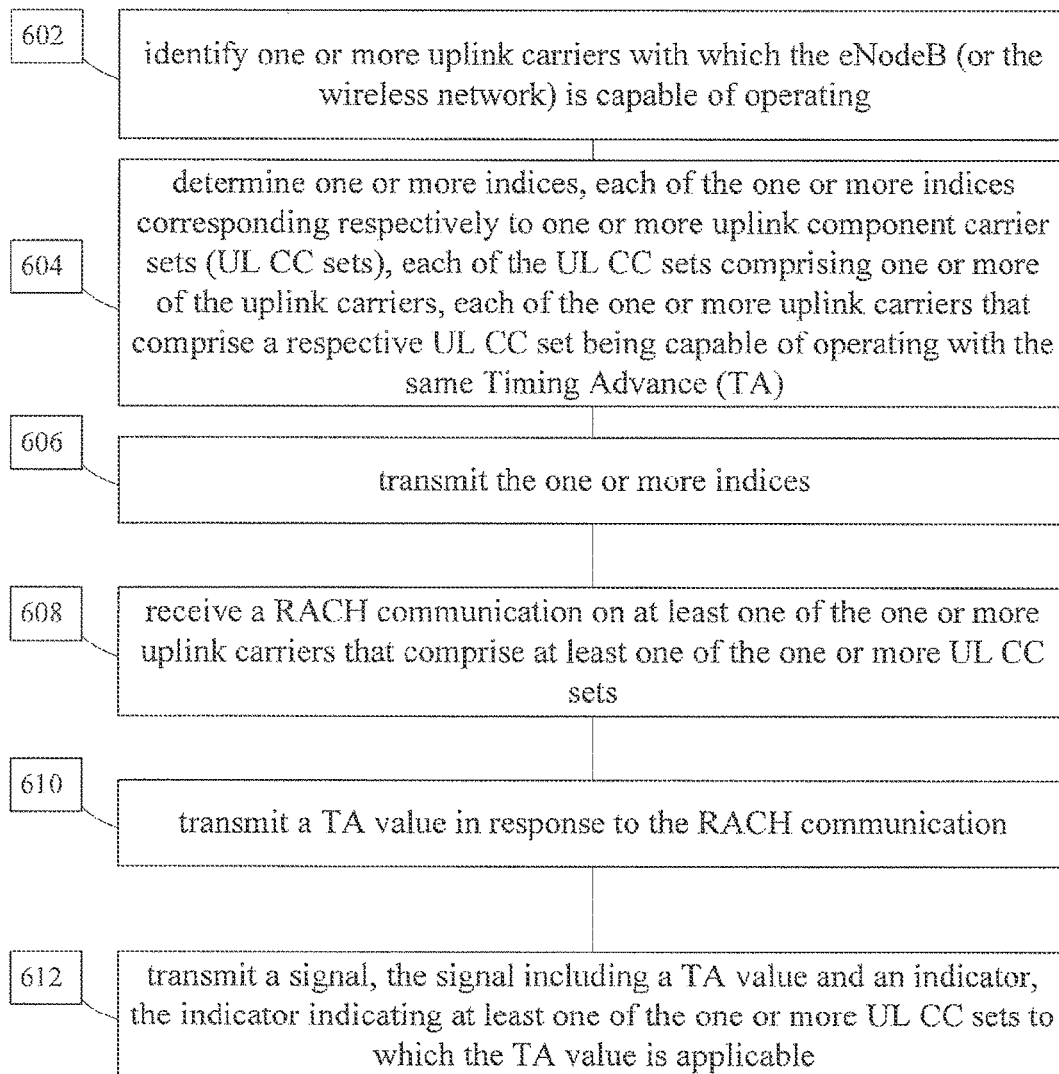
FIG. 6 illustrates a flow chart of an exemplary method consistent with embodiments.

Referring to FIG. 6, embodiments contemplate a wireless network resource, such as an evolved Node B (eNodeB), may be configured, at least in part, at 602, to identify one or more uplink carriers with which the eNodeB (or the wireless network) may be capable of operating. The eNodeB may be configured, at 604, determine one or more indices. Each of the one or more indices may correspond respectively to one or more uplink component carrier sets (UL CC sets). Also, each of the UL CC sets may comprise one or more of the uplink carriers, and each of the one or more uplink carriers that comprise a respective UL CC set may be capable of operating with the same Timing Advance (TA). The eNodeB may, at 606, be configured to transmit the one or more indices.

Embodiments contemplate that the eNodeB may be configured to, at 608, receive a RACH communication on at least one of the one or more uplink carriers that comprise at least one of the one or more UL CC sets and may, at 610, transmit a TA value in response to the RACH communication. The TA value may be applicable to each of the one or more uplink carriers that comprise the at least one of the one or more UL CC sets. Alternatively or additionally, the eNode B may be, at 612, configured to transmit a signal, where the signal may include a TA value and an indicator. The indicator may be a Group Index, for example. The indicator may indicate at least one of the one or more UL CC sets to which the TA value may be applicable.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
a memory; and
a processor, the processor configured, at least to:
determine two or more sets of uplink (UL) component carriers, each of the two or more sets of UL component carriers being associated with a respective group index, and each of the two or more sets of UL component carriers comprising UL carriers that are configured to operate with a common Timing Advance (TA);
start or restart a Time Alignment Timer (TAT) associated with a first set of UL component carriers of the two or more sets of UL component carriers;
receive a first common TA value associated with the first set of UL component carriers;
apply the first common TA value to at least a first uplink carrier that is included in the first set of UL component carriers;
determine whether the first set of UL component carriers comprises a primary cell (PCell);
release one or more configurations for at least one cell in each of the two or more sets of UL component carriers when the first set of UL component carriers includes the PCell and the TAT has expired for the first set of UL component carriers; and
release one or more configurations for at least one cell in the first set of UL component carriers when the first set of UL component carriers does not include the PCell and the TAT has expired for the first set of UL component carriers.

2. The WTRU of claim 1, wherein the processor is further configured to:
select the first set of UL component carriers;
initiate a random access channel (RACH) communication using at least the first uplink carrier that is included in the first set of UL component carriers; and
receive the first common TA value in response to the RACH communication.

3. The WTRU of claim 2, wherein the first common TA value is applied using a Timing Advance Command received in a Random Access Response message received in response to the RACH communication.

4. The WTRU of claim 1, wherein the first common TA value is applied using a Timing Advance Command of a Timing Advance Command Medium Access Control (MAC) control element.

5. The WTRU of claim 1, wherein the first set of UL component carriers includes at least one UL carrier with a dedicated physical uplink control channel (PUCCH) configuration, and the processor is further configured to cease transmitting on a resource corresponding to a PUCCH upon an expiration of the TAT.

6. The WTRU of claim 1, wherein the first set of UL component carriers includes at least one UL carrier with at least one of a dedicated physical uplink control channel (PUCCH) configuration or a sounding and reference signal (SRS) configuration, and the processor is further configured to remove at least a part of either the dedicated PUCCH configuration or the SRS configuration upon an expiration of the TAT.

7. The WTRU of claim 1, wherein each of the two or more sets of UL component carriers has a reference carrier.

8. The WTRU of claim 2, wherein the processor is further configured such that the initiation of the RACH communication using at least the first uplink carrier that is included in the first set of UL component carriers includes an initiation of a contention free based RACH procedure.

9. The WTRU of claim 1, wherein the processor is further configured to:
receive a second common TA value associated with a reference carrier; and
apply the second common TA value to a second uplink that is included in a second set of UL component carriers.

10. The WTRU of claim 1, wherein the processor is further configured to flush Hybrid Automatic Repeat Request (HARQ) buffers corresponding to the first set of UL component carriers upon an expiration of the TAT.

11. A method for establishing a timing advance, comprising:
determining two or more sets of uplink (UL) component carriers, each of the two or more sets of UL component carriers being associated with a respective group index, and each of the two or more sets of UL component carriers comprising UL carriers that are configured to operate with a common Timing Advance (TA);
starting or restarting a Time Alignment Timer (TAT) associated with a first set of UL component carriers of the two or more sets of UL component carriers;
receiving a first common TA value associated with the first set of UL component carriers;
applying the first common TA value to at least a first uplink carrier that is included in the first set of UL component carriers;
determine whether the first set of UL component carriers comprises a primary cell (PCell);
release one or more configurations for at least one cell in each of the two or more sets of UL component carriers when the first set of UL component carriers includes the PCell and the TAT has expired for the first set of UL component carriers; and release one or more configurations for at least one cell in the first set of UL component carriers when the first set of UL component carriers do not include the PCell and the TAT has expired for the first set of UL component carriers.

12. The method of claim 11, further comprising:
selecting the first set of UL component carriers;
initiating a random access channel (RACH) communication using at least the first uplink carrier that is included in the first set of UL component carriers; and
receiving the first common TA value in response to the RACH communication.

13. The method of claim 12, further comprising receiving a Timing Advance Command in a Random Access Response message received in response to the RACH communication, wherein the first common TA value is applied using the Timing Advance Command.

14. The method of claim 11, further comprising applying the first common TA value using a Timing Advance Command of a Timing Advance Command Medium Access Control (MAC) control element.

15. The method of claim 11, wherein the first set of UL component carriers includes at least one UL carrier with a dedicated physical uplink control channel (PUCCH) configuration, and the method further comprises ceasing transmissions on a resource corresponding to a PUCCH upon an expiration of the TAT.

16. The method of claim 11, wherein the first set of UL component carriers includes at least one UL carrier with at least one of a dedicated physical uplink control channel (PUCCH) configuration or a sounding and reference signal (SRS) configuration, and the method further comprises removing at least a part of either the dedicated PUCCH configuration or the SRS configuration upon an expiration of the TAT.

17. The method of claim 11, wherein each of the two or more sets of UL component carriers has a reference carrier.

18. The method of claim 12, wherein the initiating the RACH communication using at least the first uplink carrier that is included in the first set of UL component carriers includes initiating a contention free based RACH procedure.

19. The method of claim 11, further comprising:
receiving a second common TA value associated with a reference carrier; and
applying the second common TA value to a second uplink carrier that is included in a second set of UL component carriers.

20. The method of claim 11, further comprising flushing Hybrid Automatic Repeat Request (HARQ) buffers corresponding to the first set of UL component carriers upon an expiration of the TAT.

* * * * *